US008756993B2

(12) United States Patent
Lamy-Perbal et al.

(10) Patent No.: US 8,756,993 B2
(45) Date of Patent: Jun. 24, 2014

(54) INERTIAL TRACKING DEVICE, SHOE AND PERSONAL APPARATUS PROVIDED WITH SUCH A DEVICE

(75) Inventors: Sylvie Lamy-Perbal, Verrieres le Buisson (FR); Clement Petres, Tours (FR); Alain Riwan, Chevilly-Larue (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 290 days.

(21) Appl. No.: 13/318,381

(22) PCT Filed: May 17, 2010

(86) PCT No.: PCT/EP2010/056743
§ 371 (c)(1),
(2), (4) Date: Nov. 1, 2011

(87) PCT Pub. No.: WO2010/133553
PCT Pub. Date: Nov. 25, 2010

(65) Prior Publication Data
US 2012/0060393 A1 Mar. 15, 2012

(30) Foreign Application Priority Data

May 19, 2009 (FR) ...................................... 09 02421

(51) Int. Cl.
*G01P 1/02* (2006.01)
*A43B 5/04* (2006.01)
*A43B 23/00* (2006.01)
(52) U.S. Cl.
USPC .................................. 73/493; 36/132; 36/136

(58) Field of Classification Search
USPC .............. 73/493, 431, 489–492; 36/132, 136, 36/137, 103, 61
See application file for complete search history.

(56) References Cited

U.S. PATENT DOCUMENTS

| 6,122,340 | A  | * | 9/2000 | Darley et al. ................. 377/24.2 |
| 6,266,623 | B1 | * | 7/2001 | Vock et al. ....................... 702/44 |
| 6,836,744 | B1 | * | 12/2004 | Asphahani et al. ........... 702/141 |
| 7,225,565 | B2 | * | 6/2007 | DiBenedetto et al. ........... 36/132 |
| 7,607,243 | B2 | * | 10/2009 | Berner et al. .................... 36/136 |
| 7,631,382 | B2 | * | 12/2009 | DiBenedetto et al. ....... 12/142 P |
| 2003/0009308 | A1 | * | 1/2003 | Kirtley .......................... 702/141 |
| 2009/0071805 | A1 |   | 3/2009 | Horning et al. |
| 2011/0153197 | A1 | * | 6/2011 | Song ............................. 701/201 |

FOREIGN PATENT DOCUMENTS

| CN | 102835771 | * | 12/2012 |
| CN | 102871285 | * | 1/2013 |
| JP | 2008-268098 | * | 11/2008 |

* cited by examiner

*Primary Examiner* — Helen Kwok
(74) *Attorney, Agent, or Firm* — Sughrue Mion, PLLC

(57) ABSTRACT

An inertial navigation device for fitting to an article that bears intermittently against a surface. The device comprises an inertial unit having at least one inertial sensor, and a mechanical connector structure for connecting the inertial unit to the article. In the device, the connector structure is arranged (1) to provide mechanical coupling between the inertial unit and the article when the article is not bearing against the surface and (2) to provide mechanical decoupling therebetween when the article is bearing against the surface, in such a manner that the inertial unit is substantially stationary relative to the surface when the article is bearing against the surface. A shoe and equipment is provided with such a device.

10 Claims, 2 Drawing Sheets

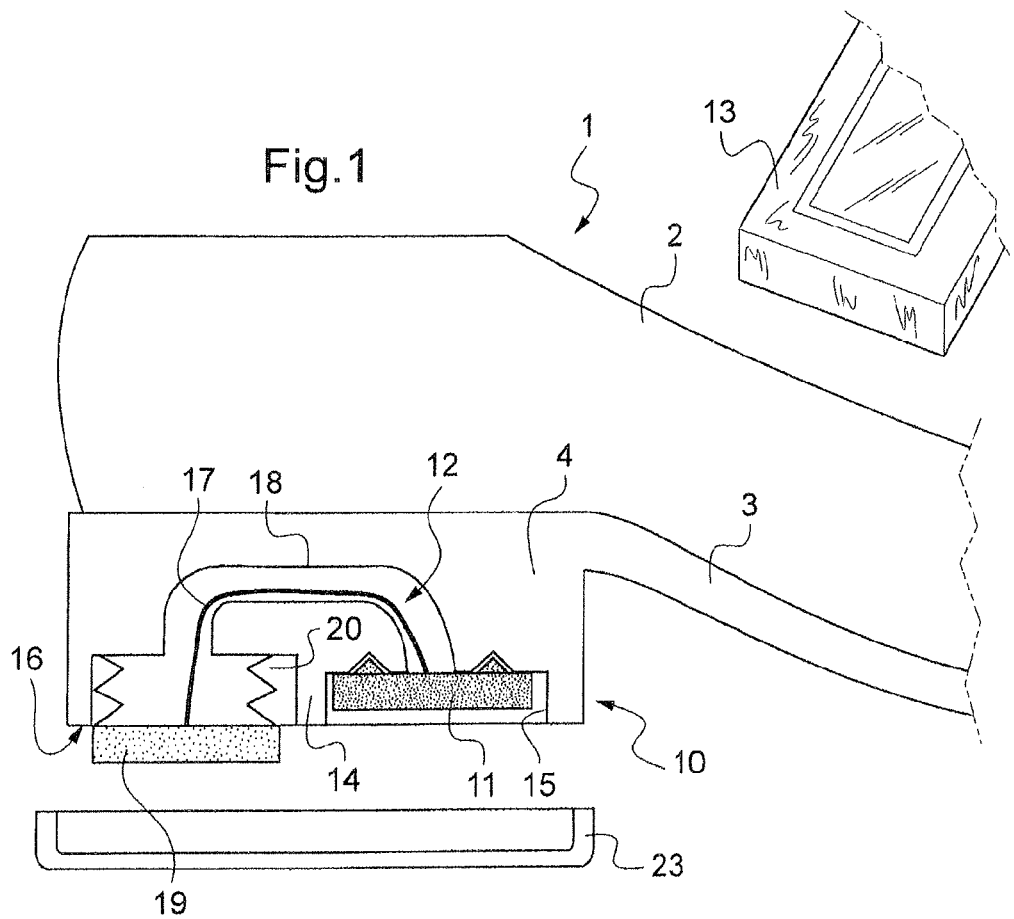
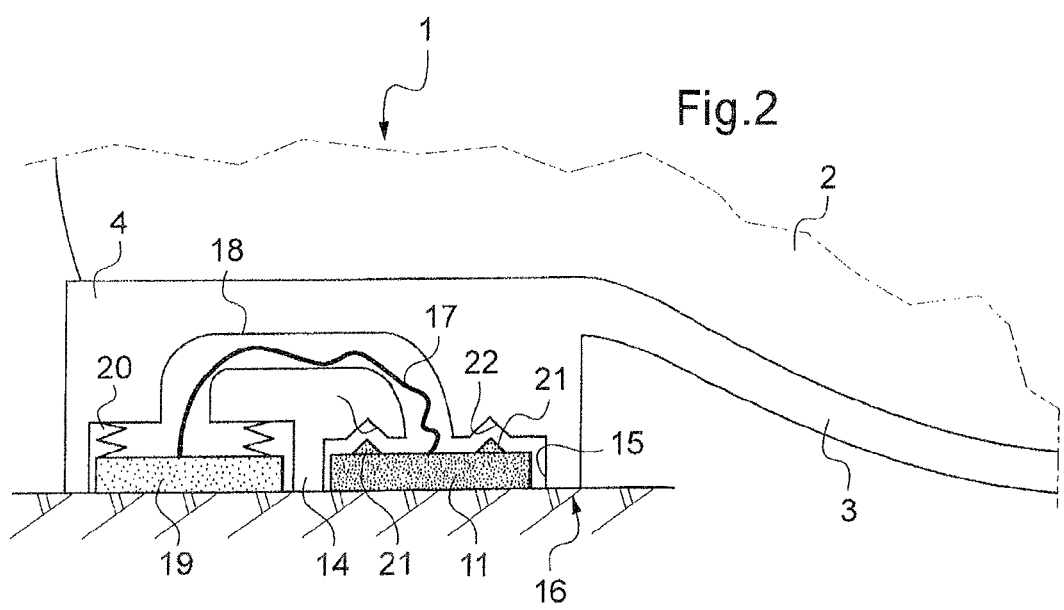

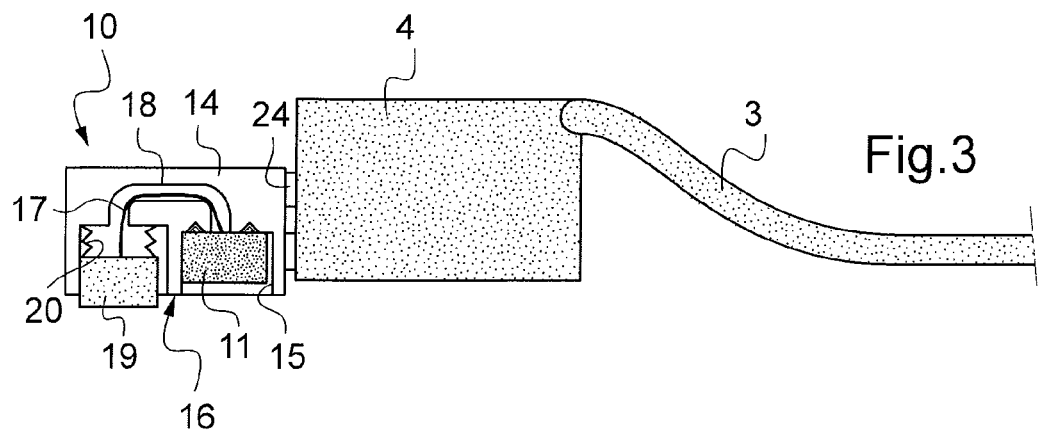
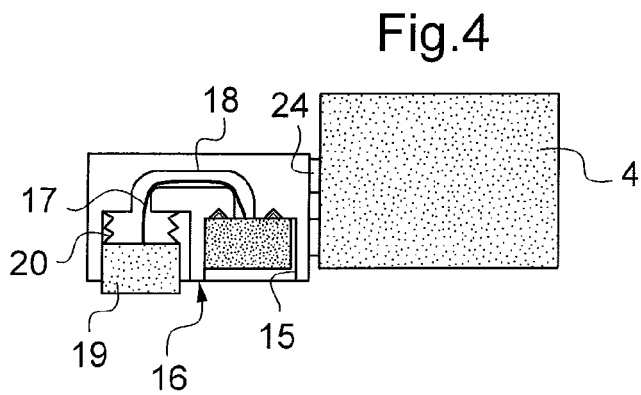
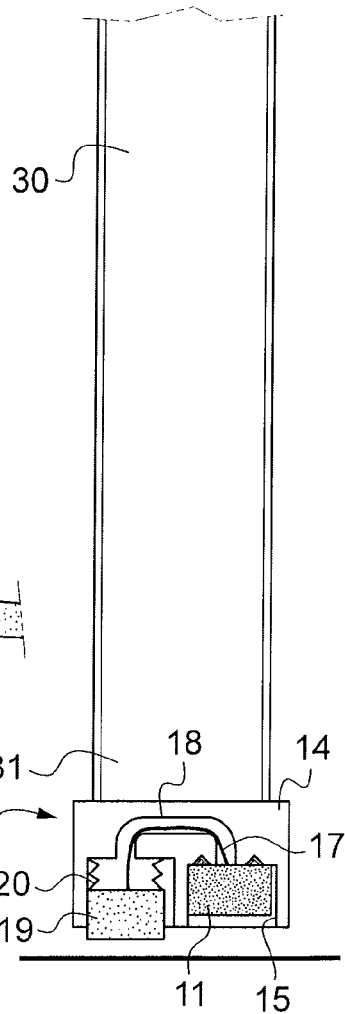
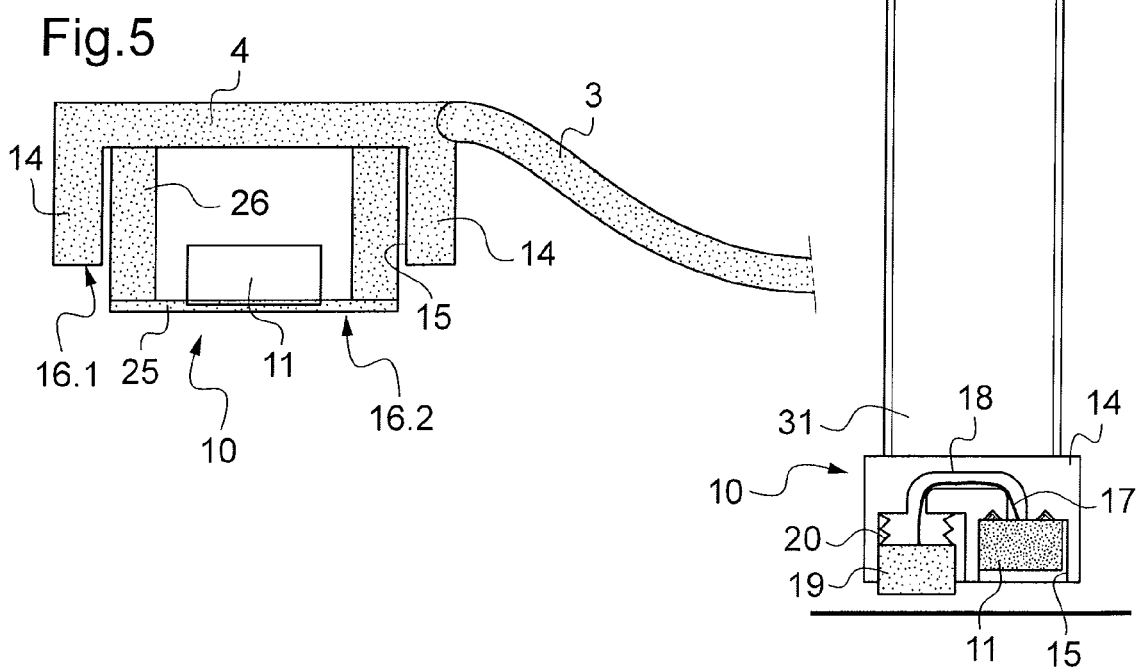

INERTIAL TRACKING DEVICE, SHOE AND PERSONAL APPARATUS PROVIDED WITH SUCH A DEVICE

CROSS REFERENCE TO RELATED APPLICATIONS

This application is a National Stage of International Application No. PCT/EP2010/056743 filed May 17, 2010, claiming priority based on French Patent Application No. 09 02421 filed May 19, 2009, the contents of all of which are incorporated herein by reference in their entirety.

FIELD OF THE INVENTION

The present invention relates to an inertial position-locating device. The invention applies more particularly to navigation for people who do not know the topography of the site in which they find themselves and who cannot use eyesight as their main position-identifying means, or who do not wish to do so. The invention may thus be used by visually handicapped people. The invention also provides a shoe and equipment for a person provided with such a device.

BACKGROUND OF THE INVENTION

In the field of assisting people to navigate, it is known to use satellite type positioning systems such as the global positioning system (GPS) or the Galileo system. Those systems require the user to have a satellite signal receiver that incorporates a calculation unit arranged to calculate the position of the receiver on the basis of signals from satellites. When associated with mapping software, such systems are particularly effective. Nevertheless, it is not always possible to pick up satellite signals in certain environments, and in particular inside certain buildings, and for example inside a subway system.

Navigation systems dedicated for navigating inside buildings require the buildings to be fitted with those systems in advance so as to enable a device carried by a user to identify its position by triangulation. That obliges the user to restrict movements to sites that are known to be fitted in that way. Furthermore, the investment required usually dissuades the organizations in charge of running such buildings from installing such systems.

The navigation of users within buildings thus generally remains assisted solely by signaling for providing guidance and identifying positions. That technique for providing navigation assistance is not available to visually handicapped people and it requires lighting conditions that are not always available (e.g. during a power cut).

Proposals have therefore been made for a navigation system making use of an inertial device comprising an inertial unit having gyros and accelerometers, and mechanical connection means between the inertial unit and the user. Knowing the user's starting point, such as the entry to the building, it is possible to determine the track followed by the user in the building by integrating the acceleration and speed-of-rotation signals delivered by the inertial unit. The results of such navigation systems have been found to be encouraging in spite of relatively great inaccuracy that makes it difficult to navigate in buildings having a large density of passageways.

A major portion of such inaccuracy stems from the continuous drift of the sensors, in particular when they are inexpensive bottom-of-range sensors. In order to limit the effects of such drift on track calculation, it has been envisaged that the inertial unit can be secured to the user's foot so as to stop integration of the signal whenever the foot is on the ground. This also makes it possible to reset certain operating parameters when the foot is on the ground, such as resetting the identified position of the inertial unit in the terrestrial frame of reference. The accuracy of the system is thus improved significantly.

OBJECT AND SUMMARY OF THE INVENTION

An object of the invention is to propose means for further improving the accuracy of such systems by limiting the causes of disturbances external to the sensor.

It has been observed that a foot is never completely stationary while it is on the ground.

When the foot is placed on the ground it still performs small movements, some of which are not visible to the naked eye, but which are nevertheless transmitted to the shoe. These movements are necessary for walking and they are generally uncontrollable. These movements give rise to error that needs to be corrected, and software correction of such error is not possible, since the error is neither quantifiable nor predictable.

To remedy this drawback, the invention provides an inertial navigation device for fitting to an article that bears intermittently against a surface, the device comprising an inertial unit having at least one inertial sensor, and mechanical connection means connecting the inertial unit to the article. The connection means are arranged to provide mechanical coupling between the inertial unit and the article when the article is not bearing against the surface and to provide mechanical decoupling therebetween when the article is bearing against the surface, in such a manner that the inertial unit is substantially stationary relative to the surface when the article is bearing against the surface.

By way of example, the surface may be the ground. The article in question, particularly when it is held or worn by a user, such as a shoe, for example, can move under voluntary or involuntary action of the user while it is in contact with the ground. The invention serves to limit the transmission of such movements to the inertial unit during stages of bearing against the ground, while ensuring that the movements of the article are indeed transmitted when the article is moving relative to the ground. This makes it possible to keep the inertial unit stationary for as long as possible during stages in which the article is bearing against the ground.

Preferably, the connection means comprise a support defining a housing that receives the inertial unit to slide vertically and that has a bottom surface for extending facing the surface when the article is bearing against the surface and, advantageously, the bottom surface constitutes a bearing surface of the support for bearing against the surface.

The support may provide the inertial unit with protection and make it easier to fasten or incorporate the inertial device to or in the article.

In two alternative embodiments:
the housing receiving the inertial unit opens out into the bottom surface in order to enable the inertial unit to be put into contact with the surface; and
the bottom surface forms part of a rigid plate closing the housing for receiving the inertial unit, the inertial unit coming to bear against the rigid plate at least when the rigid plate is in contact with the surface.

The inertial unit is thus directly in contact with the ground or in contact therewith via a rigid plate, while the support takes up the force with which the device bears against the ground.

In a preferred embodiment the connection means comprise a flexible wire connecting the inertial unit to the support and having a length such that the wire is tensioned when the article is lifted off the ground and slack when the article is bearing against the surface and, advantageously, the wire extends in a duct and has one end attached to the inertial unit and an opposite end attached to a counterweight received to slide vertically in the support between a position projecting from the bottom surface of the support in order to bear against the surface, and a pushed-in position.

The wire is of a length that is suitable both to move the inertial unit during stages in the air where the article is lifted off the ground, and to maximize the length of time the inertial unit is held stationary during stages in which the article is bearing against the ground.

The invention also provides a shoe in which the support forms a portion of the sole, and equipment for a person, such as a walking stick or staff, or a walking frame, that is fitted with a navigation device in accordance with the invention.

BRIEF DESCRIPTION OF THE DRAWINGS

Other characteristics and advantages of the invention appear on reading the following description of particular, non-limiting embodiments of the invention.

Reference is made to the accompanying drawings, in which:

FIG. 1 is a diagrammatic longitudinal section view of a shoe fitted with a device in a first embodiment of the invention, the shoe being raised above the ground;

FIG. 2 is a view analogous to FIG. 1, the shoe being pressed against the ground;

FIG. 3 is a view analogous to FIG. 1 of a shoe fitted with a device in accordance with a second embodiment of the invention;

FIG. 4 is a diagrammatic view in cross-section of a shoe fitted with a device, FIG. 4 showing a variant in the positioning of the device;

FIG. 5 is a view analogous to FIG. 1 of a shoe fitted with a device in a third embodiment of the invention; and FIG. 6 is a fragmentary diagrammatic view of a walking stick fitted with a device in accordance with the second embodiment.

MORE DETAILED DESCRIPTION

With reference to FIGS. 1 to 5, the invention is described in its application to a shoe 1 having an upper 2 and a sole 3 in which the rear portion is shaped to form a raised heel 4.

The shoe 1 incorporates an inertial navigation device 10 comprising an inertial unit 11 and mechanical connection means 12 connecting the inertial unit 11 to the shoe 1.

In known manner, the inertial unit 11 comprises gyros and accelerometers connected to a calculation unit, itself connected to a power supply battery and to a transceiver providing a wireless (preferably radio) connection between the calculation unit and a digital terminal 13 incorporating a track calculation program and mapping software. The calculation unit is arranged to recover signals from the gyros and the accelerometers and to process them so as to be capable of sending data to the digital terminal 13 to enable it to determine the track followed by the inertial unit 11. The digital terminal 13 is of the personal digital assistance (PDA) type and the mapping software enables the calculated track to be marked on a map of the site stored in the terminal and to determine a route to be followed in order to reach a preprogrammed destination point. The digital terminal 13 also includes a voice synthesis program that enables it to communicate vocally with the user to indicate the route to be followed.

The connection means 12 are arranged between the inertial unit 11 and the shoe 1 to provide mechanical coupling when the shoe is not bearing against the ground (FIG. 1), and mechanical decoupling when the shoe is bearing against the ground in such a manner that the inertial unit 11 is substantially stationary relative to the ground while the shoe is bearing against the ground (FIG. 2).

With reference more particularly to FIGS. 1 and 2, in the first embodiment, the connection means 12 comprise a support 14 defining a housing 15 that receives the inertial unit 11 to slide vertically and that presents a bottom surface 16 that is to extend facing the ground when the shoe bears against the ground. The bottom surface 16 constitutes a bearing surface of the support 14 for bearing against the ground. The housing 15 opens out into the bottom surface 16 so as to enable the inertial unit 11 to be put into contact with the ground. The support 14 is housed in the heel 4 of the shoe 1 and in this example constitutes a portion of the heel 4.

The connection means 12 include an inextensible flexible wire 17 extending in a duct 18 in the support 14 and having one end attached to the inertial unit 11 and an opposite end attached to a counterweight 19 that is received to slide vertically in the support 14 between the position in which it projects from the bottom surface 16 of the support 14 to bear against the ground, and a pushed-in position. A return member 20 resiliently returns the counterweight 19 towards its projecting, lowered position. The return member 20 may be a helical compression spring or a layer of elastomer material. The length of the flexible wire 17 is such that the wire is tensioned when the shoe is lifted off the ground and slack when the shoe is bearing against the ground. Thus, when the shoe is lifted off the ground, the counterweight 19 projects from the bottom surface 16 and the inertial unit 11 is pressed against the end wall of the housing 15 (flexible wire 17 under tension) and when the shoe is bearing against the ground, the bottom surface 16, the counterweight 19, and the inertial unit 11 are all placed on the ground (flexible wire slack).

The end wall of the housing 15 and the top portion of the inertial unit 11 preferably include portions in relief of complementary shape for securing the inertial unit 11 relative to the end wall of the housing 15 under the effect of the tension in the flexible wire 17. In this example, these portions in relief comprise conical projections 21 formed on the top surface of the inertial unit 11 for co-operating with conical setbacks 22 formed in the end wall of the housing 15. In this example, these portions in relief serve to prevent the inertial unit 11 from turning relative to the support about an axis of the housing 15.

A cap 23 is provided to underlie the heel 4 and protect the inertial device 10 while the user is walking outdoors. The cap provides sufficient sealing to prevent moisture or dirt penetrating into the housings that receive the inertial unit 11 and the counterweight 19. The inertial unit is also preferably moisture- and dust-proof.

With reference to FIGS. 3 and 4, and in a second embodiment, the support 14 is independent of the sole 3 of the shoe 1 and is provided with means 24 for fastening it temporarily to the sole. The temporary fastening means 24 may for example be sticky means or automatic gripping means of the kind sold under the trademark Velcro.

In FIG. 3, the inertial navigation system 10 is fastened behind the heel 4, and in FIG. 4, it is fastened beside the heel 4.

In the third embodiment of FIG. 5, the shoe 1 incorporates an inertial navigation system 10 that includes a support 14 forming the heel of the sole 3 of the shoe 1. The support 14 defines a housing 15 receiving the inertial unit 11 to slide vertically and it possesses a bottom surface 16.1 for facing the ground when the shoe bears against the ground. In this example, the bottom surface 16.1 constitutes a bearing surface whereby the support 14 bears against the ground. The housing 15 opens into the bottom surface 16.1 in order to enable the inertial unit 11 to make contact with the ground.

A rigid plate 25 closes the housing 15 and the inertial unit 11 is secured to the top surface of the rigid plate 25.

A flexible portion 26 is arranged between the support 14 and the rigid plate 25 that is secured to the inertial unit 11. The flexible portion 26 in this example is in the form of an elastically deformable sleeve surrounding the inertial unit 11. The flexible portion 26 is thus arranged to urge the rigid plate 25 to project from the bottom surface 16 and to limit transmission to the inertial unit 11 of the movements of the shoe while the shoe is bearing against the ground. While the shoe is bearing again the ground, the bottom surface 16.2 of the rigid plate 25 bears against the ground and the bearing force of the shoe on the ground is taken up by the support 14, with the flexible portion 26 decoupling the inertial unit from the support and thus from the shoe by limiting the transmission of movements of the shoe 1 to the inertial unit 11.

In FIG. 6, there can be seen a walking stick 30 having its bottom end 31 provided with an inertial navigation device 10 that is entirely similar to the first embodiment. The support 14 in this example forms the bearing endpiece whereby the walking stick bears against the ground.

Naturally, the invention is not limited to the embodiments described but covers any variant coming within the ambit of the invention as defined by the claims.

In particular, the invention is applicable to any article that is liable to come to bear intermittently against a surface, and more particularly the ground.

The device in the third embodiment can also be used to bear against a wall or any other non-horizontal surface, since gravity is not involved in providing decoupling.

The flexible wire may have one end fastened to the end wall of the housing 15 and another end attached to the inertial unit 11. The length of the flexible wire is such as to ensure that it is slack when the bottom face of the inertial unit 11 is flush with the bottom surface 16, and tensioned when the inertial unit 11 is projecting from the bottom surface 16. A resilient return member is preferably interposed between the end wall of the housing 15 and the inertial unit 11 in order to urge the inertial unit 11 to project from the bottom surface 16.

A stationary rigid plate may close the housing 15 and the inertial unit may be connected to the support 14 so as to bear against the rigid plate only when the shoe is resting on the ground.

The inertial unit may have some other number of gyros and accelerometers.

The digital terminal 13 may include a Braille display and/or may give sound or voice indications and/or visible indications.

It should be observed that navigation is optional, it is possible for the invention to be used solely for locating the position of the user of the device.

The flexible wire may present a certain amount of extensibility so long as that does not prevent the wire going slack when the counterweight and the inertial unit are placed on the ground, or the wire being tensioned when they are lifted off the ground.

What is claimed is:

1. An inertial navigation device for fitting to an article that bears intermittently against a surface, the device comprising:
    an inertial unit having at least one inertial sensor, and
    mechanical connection means connecting the inertial unit to the article,
    wherein the connection means are arranged to provide mechanical coupling between the inertial unit and the article when the article is not bearing against the surface and to provide mechanical decoupling therebetween when the article is bearing against the surface, in such a manner that the inertial unit is substantially stationary relative to the surface when the article is bearing against the surface.

2. A device according to claim 1, wherein the connection means comprise a support defining a housing that receives the inertial unit to slide vertically and that has a bottom surface for extending facing a ground when the article is bearing against the surface.

3. A device according to claim 2, wherein the bottom surface constitutes a bearing surface of the support for bearing against the surface.

4. A device according to claim 3, wherein the housing receiving the inertial unit opens out into the bottom surface in order to enable the inertial unit to be put into contact with the surface.

5. A device according to claim 3, wherein the bottom surface forms part of a rigid plate closing the housing for receiving the inertial unit, the inertial unit coming to bear against the rigid plate at least when the rigid plate is in contact with the surface.

6. A device according to claim 2, wherein the connection means comprise a flexible wire connecting the inertial unit to the support and having a length such that the wire is tensioned when the article is lifted off the ground and slack when the article is bearing against the surface.

7. A device according to claim 6, wherein the wire extends in a duct and has one end attached to the inertial unit and an opposite end attached to a counterweight received to slide vertically in the support between a position projecting from the bottom surface of the support in order to bear against the surface, and a pushed-in position.

8. A device according to claim 2, wherein the support includes a flexible portion arranged between the support and the inertial unit and arranged to limit transmission of movements of the article to the inertial unit when the article is bearing against the surface.

9. A shoe including a sole fitted with a device in accordance with claim 2, wherein the support forms a portion of the sole.

10. Equipment for a person, the equipment being provided with a device in accordance with claim 1.

* * * * *